United States Patent Office 3,019,193
Patented Jan. 30, 1962

3,019,193
PROCESS OF TREATING THE RAW JUICE OF AGAVE PLANT LEAVES
Claude L. Spray, 4040 203rd St., Bayside, N.Y.
No Drawing. Filed Nov. 21, 1956, Ser. No. 623,538
6 Claims. (Cl. 252—87)

The present invention relates to a process of treating plants and the products resulting from such treatment, and, more particularly, to an improved process of treating Agave plants in a manner to more efficiently and effectively derive all the useful constituents thereof.

The present invention is concerned with the processing of the freshly cut fleshy leaves of Agave plants, a genus of plants including, but necessarily limited to, the century plant, the henequen plant and the sisal plant, but excluding the false aloe or *Agave virginica*. The century plant also is known as *Agave americana* or the American aloe, and the sisal plant also is known as *Agave sisalina*.

At the present time, it is known that the leaves of these plants contain three types of useful constituents, namely, fibers, juice, and steroids, waxes and the like which are present primarily in the flesh of the leaves.

For many years, the fibers of such leaves have been utilized for making rope, cord and other textile products, the quality of which depends upon the nature of the fibers derived from the leaves.

It has also been known that the juice of the leaves could be used for useful purposes, other than fermenting the same, for producing alcohol containing products therefrom, but heretofore no process has been found for preserving all of the beneficial constituents of the juice including chlorophyllin, saponin and colloids the natural sugars known as agavose ($C_{12}H_{22}O_{11}$) contained therein.

More recently, it has been discovered that the fleshy constituents of the leaves contained proteins, enzymes, steroids, waxes and other compounds which could be used as base materials for deriving pharmaceutical and industrial products of considerable value.

The processes heretofore employed to derive these three types of constituents were crude and inefficient. In fact, all the known processes for deriving at least one of the useful constituents of the leaves were carried out in a manner which was detrimental to the other constituents of the leaves. Moreover, all of these processes lacked the maximum efficiency for their intended purpose.

The present invention aims to provide a process for treating the leaves of Agave plants which insures that the various constituents have a high quality for their intended purposes and achieves a maximum yield without loss in quality or quantity of one at the expense of the others. More particularly, the present invention aims to derive the juice and fleshy constituents without degrading the fibers, whereby products of better quality can be produced from the fibers. Also, the juice and fleshy constituents are treated in a manner, after being extracted from the leaves, to preserve the useful ingredients of the juice, and to provide for efficient and effective removal of the steroids, waxes and the like from the juice, whereby high yields of the latter are obtained. The extraction of the latter materials leaves the juice in a condition to readily remove metallic ions therefrom which are deleterious when the processed juice is put to certain uses.

Accordingly, an object of the present invention is to provide a process of treating the leaves of Agave plants which eliminates the foregoing objections and disadvantages.

Another object is to provide such a process which produces better fibers and facilitates their removal from the leaves, preserves the useful ingredients of the juice, gives higher yields of steroids, waxes and the like, and enables undesirable contents of the juice to be removed in an efficient and effective manner.

A further object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects generally are accomplished by pressing the leaves of the plants, preferably through rollers, to extract the juice and fleshy constituents thereof without damaging the fibers and impairing the usefulness thereof, concentrating the mixture of juice and fleshy constituents in a manner to preserve the useful ingredients of the juice and to facilitate the removal of the fleshy constituents, and treating the resulting juice with alkaline material to condition the same for various purposes. At the same time, undesirable iron, calcium and magnesium ions are precipitated and removed in an effective manner which is made possible because steroids, waxes and other insolubles are first removed.

The process is so arranged that the three types of constituents can be recovered in two stages, and delivered to the establishments particularly interested in any one of them for further processing. For example, the pressed leaves are first conditioned to facilitate decortication and removal of the fibers, and the steroids, waxes and the like are separated in the early stages of the processing of the juice to make them available for the processing thereof.

PRESSING OF THE LEAVES

The leaves are stripped from the plants and are gathered on the plantation, and are passed through squeeze rollers which apply a sufficiently high pressure to squeeze the juice and fleshy material therefrom so thoroughly and completely that the leaves are practically dry. Such heavy pressure squeezing has a two fold advantage in that a maximum yield of juice and fleshy material is attained, and that the coarse structure of the leaves is broken down to facilitate removal of the fibers therefrom by conventional machinery in a more rapid manner and without damage to the fibers. As a result, longer and stronger fibers are derived which enhance the quality and value of the products fabricated therefrom.

The constituents which have been squeezed from the leaves may be referred to as "raw juice." This raw juice is obtained in a pure state as possible without contamination by external pulp and scraps of fibers or addition of water. The raw juice usually is at between 1° and 3° Baumé.

PRELIMINARY PROCESSING OF THE RAW JUICE

The raw juice is collected in its unadulterated condition and immediately is placed into a large jacketed steam kettle or other suitable receptacle provided with an agitator. As a safeguard against partial fermentation of the juice during the earlier stages of the heating process, about to be described, .02% of a preservative such as sodium benzoate may be admixed therein.

Heat is then supplied externally of the receptacle to heat the contents as rapidly as the equipment permits to quickly bring the contents to between about 165° F. and 180° F. which is well above the temperatures most likely to induce fermentation. Heating is then continued but at a less rapid rate, for example, at a rate to increase the temperature thereof about 1° F. per minute, until the contents are at a temperature of between about 200° F. and about 214° F. Most rapid evaporation to concentrate the juice is attained at the higher temperature, but, by approaching the same slowly, heating of the juice to a temperature at which it will foam and boil over is averted. Such temperatures are then maintained until the raw juice is concentrated to between about 15° and 20° Baumé, the higher concentration being preferred, in the event the raw juice is to be shipped from the plantation for further processing or is to be stored before processing.

During the cooking or concentrating process, it is necessary that the raw juice be agitated constantly in order to insure a uniform product and to eliminate a localized overheating and other irregularities which may cause spasmodic results. At no time may cooking be interrupted because otherwise inhibiting of fermentation and pasteurization are not assured.

The cooked raw juice is then passed through about No. 12 mesh screen to remove relatively large particles which are objectionable in the further processing of the raw juice or may induce degrading of the raw juice. However, the screen permits desired solids and colloids to pass therethrough.

Since the next step can be carried out at the plantation or at a remote location, if desired, two alternate procedures can be followed.

If further processing is to take place immediately at the plantation, the strained hot raw juice is returned to the receptacle or a similar one and sufficient pure water is added to adjust the concentration to about 15° Baumé. The raw juice is maintained at about 180° F. until the next step of the process is carried out.

If further processing is to take place at a remote location or not immediately at the plantation, between about .1% and about 1% sodium benzoate is added to the hot raw juice and thoroughly admixed therein, and the raw juice, while at a temperature of at least about 180° F. is hermetically sealed in receptacles such as conventional drums. The so treated juice remains unchanged for several weeks, whereby the raw juice may be shipped to distant destinations or may be stored at the plantation until the equipment for the next step of the process is available.

EXTRACTION OF STEROIDS AND WAXES

In the event the raw juice has been permitted to cool during storage or shipment and is at the higher concentration, the juice is diluted with pure water to adjust its concentration to about 15° Baumé, while agitating and heating the same to about 180° F. Alternatively, if the extracting step about to be described is to take place immediately after straining at the plantation, the raw juice is in this condition as previously indicated.

The raw juice in the foregoing condition is passed through a centrifuge, either of the continuous solids discharge type or the bowl type to extract steroids, waxes, colloids and the like from the raw juice. This method of extraction has been found to be extremely efficient, and it is believed that this is made possible by cooking and concentrating the juice in a manner to effect coagulation of such solids to facilitate their removal by centrifuging. The extracted solids are saved for use as the base material of other valuable products.

It has been found that such coagulation is attained when the raw juice is concentrated to about 15° Baumé and is even more pronounced when the raw juice is cooked to even higher concentration such as 20° Baumé. However, at such higher concentrations the raw juice is somewhat sticky and is not as easy to centrifuge as at 15° Baumé and therefore is diluted to such a concentration. Thus, it appears that the optimum conditions are to first concentrate the raw juice to attain maximum coagulation and then to dilute the juice to facilitate handling. This is feasible because the coagulant is not put back into solution by subsequent dilution.

The solids-free juice, as now designated, is recovered and can be further processed immediately or can be sealed in drums again for future processing. However, if this juice does not already contain between .1% and 1% sodium benzoate, such an amount should be admixed therein before storage of the juice. This juice has a pH of between about 4 and 4.8.

ALKALINE TREATMENT

The solids-free juice again is placed in a steam jacketed receptacle or the like, preferably while at room temperature, and is agitated while adding sufficient alkaline material such as caustic soda, either dry or in concentrated solution, to adjust the pH to between about 9 and 11. Usually, about 20 to 30 pounds of caustic soda on a dry basis are required for about 1000 pounds of product.

From a theoretical viewpoint, other alkaline materials such as caustic potash or ammonium hydroxide, or the like may be employed to convert the juice and adjust the alkalinity thereof to its desired pH value. However, caustic soda is preferred because of its relatively low price and general availability and its freedom from strong odor.

After the caustic soda has been dissolved and admixed, the alkaline juice is cooked at a temperature of between about 180° F. and about 200° F., with continued agitation, for a maxium of three hours or until a chocolate colored liquor is produced.

In the event the alkaline juice is to be utilized for treating boiler or cooling water, a borax compound, such as sodium tetraborate ($Na_2B_4O_7 \cdot 5H_2O$) is added in an amount of about 3% by weight while agitating the cooked juice to thoroughly cause the borax to be dissolved therein. The addition of the borax provides a buffering action.

During the final stages of the cooking step just described with or without the addition of borax, sufficient pure water is added to make up evaporative losses to thereby adjust the concentration of resulting liquor to between about 15° Baumé and to adjust the pH of the liquor to between about 9 and about 11.

THE REMOVAL OF UNDESIRABLE IONS

Heretofore, the liquor after treatment with caustic soda was required to stand for one to four weeks to permit insoluble particles to settle and was then filtered to remove such particles. In accordance with the present process, it would appear that by removing the steroids and waxes prior to such caustic soda treatment the liquor should be free of insoluble solids. However, tests revealed that the liquor still had small particles resembling a precipitate in suspension therein. Small amounts of such particles were removed and subjected to qualitative analysis, and it was discovered that these particles were insoluble hydroxides of metals, chiefly iron, calcium and magnesium.

Upon further investigation, it was found that the raw juice contains organic complexes of iron which explains the presence of iron in the processed juice. It is thus believed, that by removing waxes and steroids before the caustic soda treatment, these complexes are now capable of being converted to the insoluble hydroxide or oxides of iron by the caustic soda treatment. It was also found that the juice of the plant contains calcium and magnesium ions, and that calcium and magnesium ions are introduced by the use of tap water, particularly if such water is relatively hard. The caustic soda treamtent converts these calcium and magnesium ions to insoluble hydroxides.

In furtherance of the present invention, it was found that these insolubles could be removed effectively by passing the liquor through the centrifuge again, whereby the finished product, now ready for packaging, is free of waxes and minerals capable of forming insoluble salts and has a reduced steroid content. This manner of treatment not only removes the iron content from the juice which may cause difficulties in using the juice for boiler or cooling water treatment, but also eliminates the necessity of additional treatment of the liquor to remove calcium and magnesium ions therefrom.

The resulting product is substantially free from sediment and has an almost black color because the lighter colored salts produced by the caustic soda treatment have been removed from the chocolate colored liquor to thereby darken the same. This product is expected to have a shelf-life of several years if kept sealed in containers to exclude air therefrom. This is based on tests carried out during the past six months which consisted of placing samples of the product in sealed glass bottles and allowing them to stand at rest for several months. In the worst cases, there was only an extremely slight amount of sediment at the bottom of the bottles which was readily put in suspension again by shaking the bottles. This sediment is believed to be caused by natural colloids held in suspension and which is believed to have a beneficial action.

The product has bland leafy taste somewhat like celery, thus indicating that the juice is not sour and that the natural sugars have been retained in unaltered chemical composition and have been pasteurized and stabilized against deterioration. The chemical content of the product, without the addition of borax, in no case exceeds about 3% by weight.

*Example I*

A specific example of carrying out the process in a continuous manner at the source of the leaves to produce the final product will not be described, but it will be appreciated that this process could be accomplished in stages depending upon the constituents in which are to be recovered for further processing.

Fresh leaves of century plants were pressed in the manner hereinbefore specified and the juice and fleshy contents were collected and placed in a steam jacketed receptacle equipped with an agitator. The raw juice had a concentration of 3° Baumé. While applying agitation, the raw juice was heated rapidly to about 180° F. and then more slowly to about 214° F. Heating was continued at about 214° F. to concentrate the raw juice until it had a concentration of 20° Baumé.

The raw concentrated juice was passed through a No. 12 mesh screen to remove large particles and was returned to the receptacle while hot. Pure water was added to adjust the concentration to about 15° Baumé and the temperature of the juice was kept at 180° F., with constant agitation.

The juice was then passed through a centrifuge of the bowl type and about 150 pounds of solids were extracted from about 1000 pounds of juice. The solids-free juice had a pH of about 4. This juice was returned to the receptacle and a .5% sodium benzoate was admixed therein. The juice was permitted to cool to about room temperature, and about 30 pounds of caustic soda were admixed therein. This step can be carried out while the juice is hot provided the receptacle is only about three quarters full to have sufficient head room in case of excessive foaming during the addition of the caustic soda. The juice was cooked at 200° F. for three hours to produce a chocolate colored liquor. Pure water was added to adjust the concentration to about 15° Baumé. This liquor had a pH of about 10.

This liquor was passed through the centrifuge again and about 25 pounds of solids were extracted from about 1000 pounds of liquor to provide an almost black final product having a concentration of 15° Baumé and a pH of 10.

This product is primarily useful in clearing drains of grease, cleaning tile, washing dishes, removing scale from steam boilers and water cooled equipment and the like, and many other similar purposes.

*Example II*

The foregoing process was repeated, but, at the end of the cooking treatment with caustic soda, 3% by weight of sodium tetraborate ($Na_2B_4O_7 \cdot 5H_2O$) was thoroughly admixed therein. The borax provides a buffering action to prevent alkaline corrosion. This is desirable in cases where water containing the product is continually in contact with boiler or cooling structure which is subject to corrosion.

The product produced in accordance with Example II was tested extensively by the addition of small amounts thereof to boiler water, for example, about one gallon of product for between 20,000 and 40,000 gallons of water in case water is lost by the use of steam externally of the system so that the boiler will eventually contain about one gallon of product for 500 gallons of water which is the desired ratio for a closed system. The proper ratio in each case depends on the hardness of the water and the condition of the equipment and is determined by testing the water. Less product is required where its use is primarily for scale preventing than where corrosion is the primary problem.

As a specific example, one gallon of product was added to 500 gallons of water supplied to a boiler for a closed system. It was found that the treated water removed scale previously deposited and materially inhibited the formation of fresh scale.

As another specific example, one gallon of product was added to 500 gallons of water supplied to an air conditioning unit. It was again found that the treated water removed scale previously deposited and materially inhibited the formation of fresh scale.

The effectiveness of the product is attributed to the presence of the natural sugars, colloids and steroids in suspension therein which prevent the formation of rust and scale; and the freedom of iron, calcium and magnesium ions which are contaminants sought to get rid of in this equipment.

The product in accordance with the present invention keeps the "hard particles" in the water suspended to prevent scale formation and enables such particles to settle as a slushy mass which can be readily removed when the equipment is blown down. The product also prevents the adherence of oil to the water side of boilers, and keeps steam lines and valve passages clean.

From the foregoing description, it will be seen that the present invention provides a practical process for producing a useful product and enables other constituents to be recovered in an enhanced state.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

This application is a continuation-in-part of my prior application Serial No. 572,637, filed March 20, 1956, which is a continuation-in-part of my prior applications Serial No. 368,526, filed July 16, 1953, and Serial No. 389,889, filed November 2, 1953, all now abandoned.

I claim:

1. The process comprising heating the raw juice of Agave plant leaves containing the juicy and fleshy constituents thereof at a temperature of between about 200° F. and about 214° F. for a sufficient duration to concentrate the same to between about 15° and about 20° Baumé, centrifuging the concentrate to extract the solids content therefrom, adding sufficient alkaline material to the solids free juice to adjust the pH to between about 9 and about 11, heating the alkaline juice at a temperature of between about 180° F. and about 200° F. and for a sufficient duration to precipitate iron, calcium and magnesium ions contained in the juice, and centrifuging the liquor to remove the precipitate therefrom.

2. The process comprising heating the raw juice of Agave plant leaves containing practically all of the juicy and fleshy constituents thereof at a temperature of between about 200° F. and about 214° F. for a sufficient duration to concentrate the same to between about 15° and about 20° Baumé, centrifuging the concentrate to extract practically all the solids therefrom, adding sufficient alkaline material to the solids free juice to adjust the pH to between about 9 and about 11, heating the alkaline juice at a temperature of between about 180° F. and about 200° F. and for a sufficient duration to precipitate iron, calcium and magnesium ions contained in the juice, and centrifuging the liquor to remove the precipitate therefrom, said precipitating step being facilitated by the prior removal of the solids content of the juice.

3. The process comprising heating the raw juice of Agave plant leaves containing the juicy and fleshy constituents thereof at a temperature of between about 200° F. and about 214° F. for a sufficient duration to concentrate the same to between about 15° and about 20° Baumé, centrifuging the concentrate to extract the solids content therefrom, adding sufficient alkaline material to the solids-free juice to adjust the pH to between about 9 and about 11, heating the alkaline juice at a temperature of between about 180° F. and about 200° F. and for a sufficient duration to precipitate iron, calcium and magnesium ions contained in the juice, and centrifuging the liquor to remove the precipitate therefrom, said heating and adding steps being accompanied by agitation.

4. The process comprising heating the raw juice of Agave plant leaves containing practically all of the juicy and fleshy constituents thereof at a temperature of about 214° F. and for a sufficient duration to concentrate the same to about 20° Baumé, adding sufficient pure water to reduce the concentration to about 15° Baumé, centrifuging the juice to remove solid content therefrom while maintaining the juice at about 180° F., adding sufficient caustic soda to adjust the pH to about 10, heating the alkaline juice at a temperature of about 200° F. and a sufficient duration to precipitate iron, calcium and magnesium ions contained in the juice to produce a chocolate colored liquor, and centrifuging the liquor to remove the precipitate therefrom and change the color almost to black.

5. The process comprising heating the raw juice of Agave plant leaves containing practically all of the juicy and fleshy constituents thereof at a temperature of about 214° F. and for a sufficient duration to concentrate the same to about 20° Baumé, adding sufficient pure water to reduce the concentration to about 15° Baumé, centrifuging the juice to remove solid content therefrom while maintaining the juice at about 180° F., adding sufficient caustic soda to adjust the pH to about 10, heating the alkaline juice at a temperature of about 200° F. and for about three hours to precipitate iron, calcium and magnesium ions contained in the juice to produce a chocolate colored liquor, adding sufficient pure water to adjust concentration to about 15° Baumé and centrifuging the liquor to remove the precipitate therefrom and change the color almost to black, said heating and adding steps being accompanied by agitation.

6. The process comprising heating the raw juice of agave plant leaves containing the juicy and fleshy constituents thereof at a temperature of between about 200° F. and about 214° F. for a sufficient duration to concentrate the same to between about 15° and about 20° Baumé, centrifuging the concentrate to extract the solids content therefrom, adding sufficient alkaline material to the solids free juice to adjust the pH to between about 9 and about 11, heating the alkaline juice at a temperature and for a sufficient duration to precipitate iron, calcium and magnesium ions contained in the juice, adding three percent by weight of borax to the liquor, and centrifuging the liquor to remove the precipitate and undissolved particles of borax therefrom.

References Cited in the file of this patent

UNITED STATES PATENTS

| | | |
|---|---|---|
| 49,931 | Spannagel | Sept. 12, 1865 |
| 2,012,641 | Smead | Aug. 27, 1935 |
| 2,111,684 | Venable | Mar. 22, 1938 |
| 2,210,463 | Nord | Aug. 6, 1940 |
| 2,260,470 | May | Oct. 8, 1941 |
| 2,281,392 | Smead | Apr. 28, 1942 |
| 2,576,386 | Bird | Nov. 27, 1951 |
| 2,587,249 | Ulmer | Feb. 26, 1952 |
| 2,720,490 | Oxford | Oct. 11, 1955 |

FOREIGN PATENTS

| | | |
|---|---|---|
| 538,271 | Great Britain | July 18, 1941 |

OTHER REFERENCES

"Amer. Pharmacy J.," Lyman (1954), pp. 203, 204.